United States Patent [19]

Frame et al.

[11] Patent Number: 5,349,690
[45] Date of Patent: Sep. 20, 1994

[54] FAIR ARBITRATION SCHEME FOR ARBITRATING BETWEEN MULTIPLE NODES IN A COMPUTER SYSTEM SEEKING CONTROL OF A COMMON BUS

[75] Inventors: Robert C. Frame, Westboro; Fernando A. Zayas, Worcester, both of Mass.; Edward A. Gardner, Colorado Springs, Colo.

[73] Assignee: Digital Equipment Corporation, Maynard, Mass.

[21] Appl. No.: 16,419

[22] Filed: Feb. 11, 1993

Related U.S. Application Data

[63] Continuation of Ser. No. 782,885, Oct. 18, 1991, abandoned, which is a continuation of Ser. No. 600,140, Oct. 17, 1990, abandoned, which is a continuation of Ser. No. 192,649, May 11, 1988, abandoned.

[51] Int. Cl.$^5$ .......................... G06F 9/22; G06F 9/46; G06F 13/18; G06F 13/36
[52] U.S. Cl. .................. 395/800; 364/228.9; 364/229; 364/229.2; 364/229.5; 364/230.1; 364/238.6; 364/238.9; 364/240; 364/240.1; 364/240.5; 364/241.6; 364/242.6; 364/242.92; 364/DIG. 1; 364/DIG. 2
[58] Field of Search ............... 395/800, 400, 425, 200, 395/550, 500, 325, 375, 275, 575, 725, 650, 250; 364/DIG. 1, DIG. 2; 340/825.5; 371/32

[56] References Cited

U.S. PATENT DOCUMENTS

| | | | |
|---|---|---|---|
| 4,229,791 | 10/1980 | Levy et al. | 395/325 |
| 4,257,095 | 5/1981 | Nadir | 395/325 |
| 4,271,465 | 6/1981 | Ohtsuka et al. | 395/325 |
| 4,320,467 | 3/1982 | Glass | 392/325 |
| 4,334,288 | 6/1982 | Booher | 395/325 |
| 4,384,323 | 5/1983 | Ahuja | 395/375 |
| 4,408,300 | 10/1983 | Shima | 395/200 |
| 4,454,581 | 6/1984 | Nystrom | 395/325 |
| 4,456,956 | 6/1984 | El-Gohary et al. | 395/200 |
| 4,463,445 | 7/1984 | Grimes | 395/325 |
| 4,621,342 | 11/1986 | Capizzi et al. | 395/325 |
| 4,785,394 | 11/1988 | Fischer | 395/325 |

FOREIGN PATENT DOCUMENTS

| | | |
|---|---|---|
| 2482745 | 5/1981 | France . |
| 5814953 | 1/1982 | Japan . |

*Primary Examiner*—Alyssa H. Bowler
*Assistant Examiner*—Daniel H. Pan
*Attorney, Agent, or Firm*—Krishnendu Gupta; Ronald C. Hudgens; Albert C. Cefalo

[57] ABSTRACT

A method and apparatus for selecting a particular node from a plurality of nodes connected to a common bus to allow the node to use the bus. The nodes have a predetermined priority. After initially enabling the nodes, the bus is monitored for a bus idle condition. It is then determined which of the nodes are enabled message nodes, which are enabled nodes that have a message to send on the bus. There is then arbitration between the enabled message nodes after the bus is in the bus idle condition for a first period of time, such that the enabled message node having the highest pre-determined priority among the enabled message nodes is disabled for arbitration purposes, and also at the same time selects a target and performs a transfer. This procedure is repeated until all the enabled message nodes have been disabled. Thereafter, all of the nodes on the bus are enabled when the bus is in the bus idle condition for a second period of time, which is longer than the first period of time.

25 Claims, 2 Drawing Sheets

FAIR ARBITRATION SCHEME FOR ARBITRATING BETWEEN MULTIPLE NODES IN A COMPUTER SYSTEM SEEKING CONTROL OF A COMMON BUS

RELATED APPLICATIONS

This application is a continuation of application Ser. No. 07/782,885, filed Oct. 18, 1991, now abandoned, which is a continuation of application Ser. No. 07/600,140, filed Oct. 17, 1990, now abandoned, which is a continuation of application Ser. No. 07/192,649, filed May 11, 1988, now abandoned.

FIELD OF THE INVENTION

The present invention relates to the field of interconnect buses for computers and more particularly, to a fair arbitration scheme for determining which of a plurality of nodes attached to the bus may take control of the bus.

BACKGROUND OF THE INVENTION

In an arrangement in which a plurality of nodes are connected to a common bus, some kind of scheme is needed to select which node will be able to use the bus at any given time. One scheme which has been used in prior systems is to assign a fixed priority to each of the nodes connected to the bus so that if two of the nodes desire to use the bus at the same time, the node having the higher priority will win every time. The advantage of using a fixed priority is that the nodes which need to use the bus the most have the most opportunity to do so. The scheme has an inherent disadvantage in that the higher priority nodes can effectively monopolize the use of the bus so that lower priority nodes may never have the opportunity to use the bus.

Another scheme which has been used in the past is a round robin arbitration. Each node is sequentially enabled in round robin fashion so that there is an equal sharing of the bus between the nodes. Although this provides equal access to all of the nodes, the scheme can be inefficient since nodes which need to use the bus more often than other nodes have to wait for the round robin to complete before being able to use the bus again. However, the nodes which use the bus less frequently are less likely to actually use the bus during their turn, so there is often a waste of the time reserved for nodes which use the bus less frequently.

SUMMARY OF THE INVENTION

It is therefore an objective of the present invention to provide a fair arbitration scheme in which all of the nodes connected to a bus have an equal opportunity to use the bus, but without the inefficiencies created by reserving time for each node to use the bus.

This and other objectives are achieved by the present invention by the provision of a method for selecting a particular node from a plurality of nodes connected to a common bus to allow the node to use the bus. The method comprises the step of enabling the nodes, each node having a pre-determined priority. The bus is monitored for a bus idle condition, and it is then determined which of the nodes are enabled message nodes, which is defined as an enabled node having a message to send on the bus. There is then arbitration between the enabled message nodes after the bus is in the bus idle condition for a first period of time, such that the enabled message node having the highest pre-determined priority among the enabled message nodes is selected to use the bus.

The selected enabled message node is disabled for purpose of arbitration while it proceeds with the selection of a target and transfer of information with that target. The above procedure (except for the enabling of all the nodes) is repeated until all the enabled message nodes have been disabled. All of the nodes are again enabled when the bus is in the bus idle condition for a second period of time, which is longer than the first period of time.

DETAILED DESCRIPTION

Figure 1:
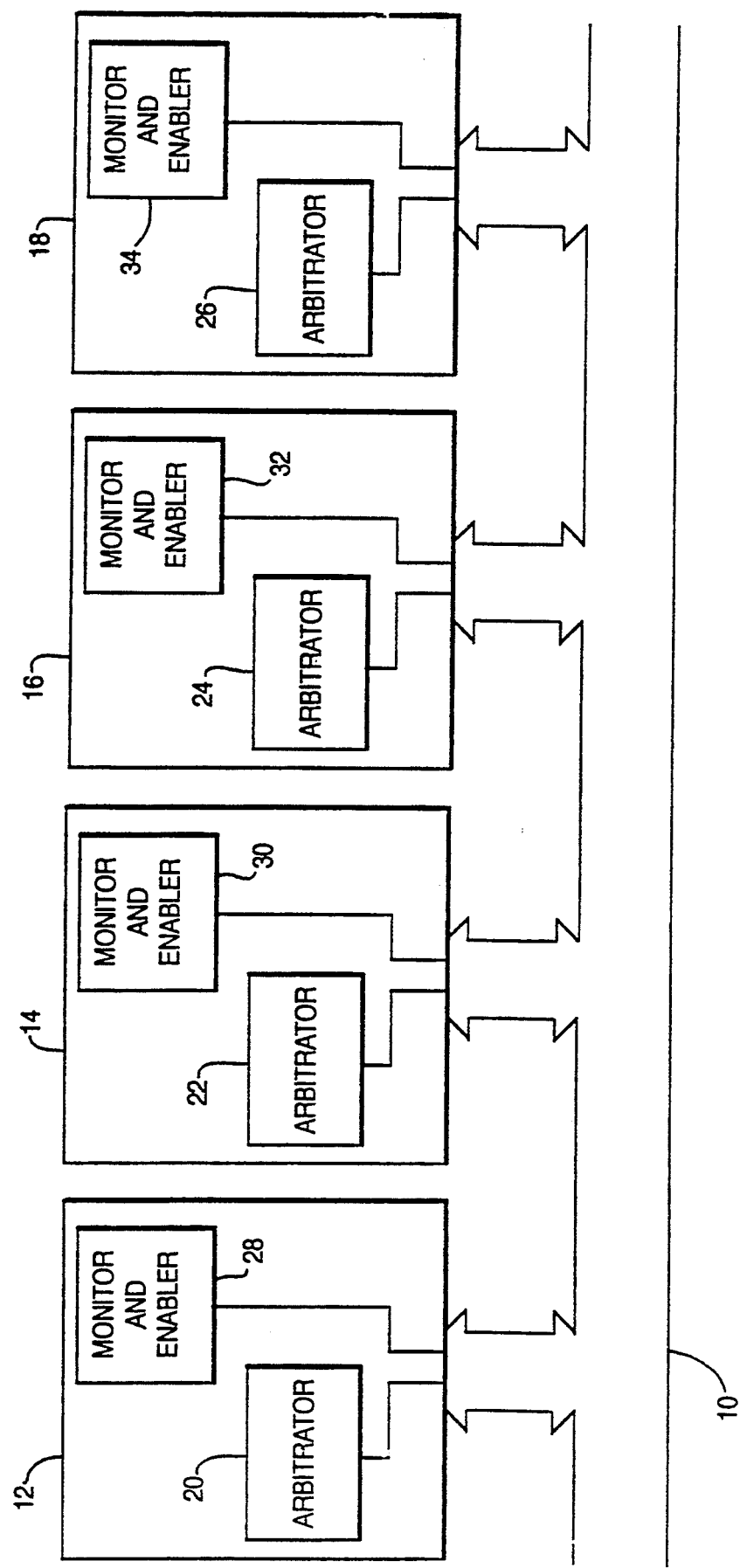
FIG. 1 shows a block diagram of the present invention.

An embodiment of the present invention is illustrated in FIG. 1, in which a storage interconnect bus 10 is connected to four nodes 12, 14, 16 and 18. These nodes 12–18 can be different types of devices, such as central processing units, peripheral memory storage units, etc. Although four nodes are shown in this exemplary embodiment, different numbers of nodes can be used without departing from the scope of the invention.

Each of the nodes 12, 14, 16 and 18 includes an arbitrator 20, 22, 24 and 26 and a monitor and enabler unit 28, 30, 32 and 34. Each of the nodes 12, 14, 16 and 18 is assigned a priority, which fixes the priority of the nodes for arbitration purposes. This can be accomplished, for example, by providing a priority identification bit in each node and comparing the priority identification bits of each enabled node (in this case nodes 12 and 16) to determine which enabled node has the highest priority. In the illustrated example, node 12 has the highest priority, node 14 the next lower, node 16 the next lower and node 18 the lowest priority. Thus, during an arbitration in which node 12 and node 16 are both attempting to use the bus 10, node 12 will win because it is the higher priority device. Devices 14 and 18 which have not asserted their busy signal and priority will continue monitoring the bus which is no longer idle due to the busy signals asserted by nodes 12 and 16.

In the arbitration block 46, the nodes 12–18 determine which of the nodes 12 and 16 wins the control of the bus 10. This is done by comparing in the arbitrators 20–26 the priority asserted by the nodes 12 and 16. Since node 12 has a higher priority, it is the winner of the arbitration and takes control of the bus 10 which now enters the selection phase block 50. All the losers of the arbitration (in this case node 16) enter a wait phase 48 and monitor the bus 10 for the bus idle condition to reappear.

The winner of the arbitration, node 12, clears its own enable flag upon winning the arbitration so that the node 12 will be disabled from arbitrating until it becomes enabled. Although it is now disabled for purposes of arbitration, node 12 continues to proceed with a selection and transfer process over the bus 10. When the bus enters the selection phase 50, node 12 selects another node, i.e. a target node, for a transfer of data. The bus 10 then enters the transfer phase 52 and node 12 receives a transfer from the target node. Regardless of the success of the transfer, the now disabled node 12 will enter the wait phase 48 if it has a message to send, i.e. is a disabled message node.

Now assume that the now disabled message node 12 and enabled nodes 14 and 16 all desire to take control of the bus 10. Upon a bus idle condition being detected for 800 nsec ($t_1$), the arbitration phase 46 is entered by nodes 14 and 16. Node 12, which is disabled, must wait until the bus is idle for a longer time span $t_2$ (shown by path 44, in the example 1600 nsec), before the node is reselected as a priority node.

The present invention overcomes the disadvantages of the prior art fixed priority and round robin arbitration schemes discussed above by the use of a fair arbitration scheme. The invention implements the fair arbitration scheme by enabling and disabling the nodes 12, 14, 16 and 18 for purposes of arbitration. Basically, only enabled nodes can participate in arbitration for the bus, and once a node wins an arbitration and takes control of the bus 10, the node becomes disabled and cannot participate in an arbitration until all of the other enabled nodes connected to the bus have had an opportunity to use the bus.

Figure 2:
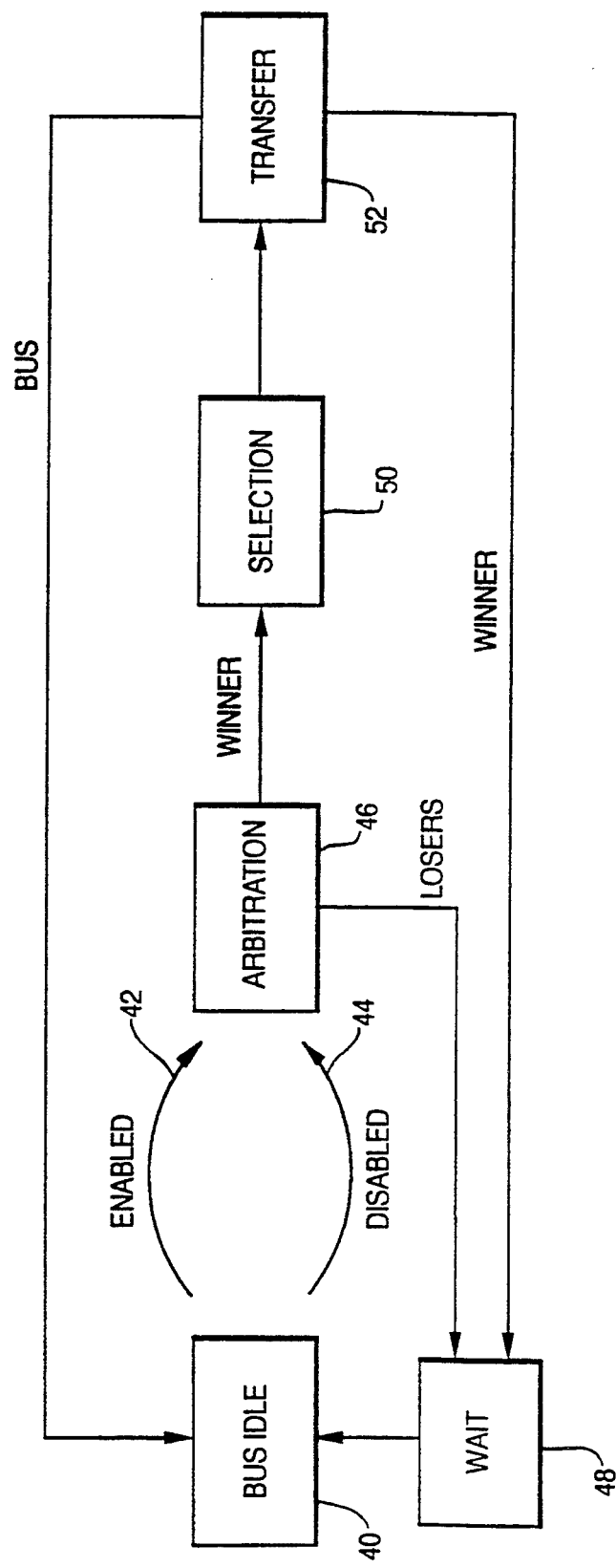
FIG. 2 is a phase diagram showing the various phases of the bus of FIG. 1 according to the present invention.

The operation of the fair arbitration scheme of the present invention will be described using the state diagram of FIG. 2. Initially, it is assumed that all of the enable flags of the nodes 12–18 are set, so that all of the nodes 12–18 are enabled and able to participate in arbitration. Nodes 12–18 continuously monitor the state of the bus 10 with the monitor and enabler units 28, 30, 32 and 34. Since we have started our example from the beginning of operation, the bus will be in a bus idle state as shown by box 40. This state is detected by each of the monitor and enabler units 28–34. The enabled nodes 12–18 assert a bus busy signal and their priority when they have a need to use the bus 10, i.e. when an enabled node wants to have a transfer of information with another node, so that these are now enabled message nodes. For now, it is assumed that only enabled nodes 12 and 16 have a need to use the bus. Since both of the nodes 12 and 16 are enabled message nodes, the phase of the bus 10 follows along an enabled path 42, which in the described embodiment takes 800 nsec ($t_1$), to the arbitration block 46. The other again becoming enabled to enter arbitration. The two nodes 12 and 16 (the enabled message nodes) arbitrate as described before after the first time period $t_1$, with node 12 winning the arbitration. After the transfer involving node 12 has been completed, it too is disabled and must wait until the bus is idle for 1600 nsec ($t_2$) before it is enabled again. However, the bus will not be idle for this longer time span since the enabled message node 16 will enter into arbitration after the bus is idle for 800 nsec ($t_1$). Since there are no other higher priority enabled nodes which desire to control the bus, node 16 wins with the transfer operating as described above.

At this point in the example, assume that, the three nodes 12–16 are all disabled, while node 18 is enabled. If node 18 needed to take control of the bus, it could do so after node 16 completes its transfer and the bus 10 is idle again for the first time period $t_1$. However, assume that the node 18 does not need to take control of the bus at this time. All of the devices 12–18 continue to monitor the bus and since no enabled node has taken control of the bus after the bus idle condition has been detected for a period of 1600 nsec ($t_2$), all the disabled nodes 12–16 once again become enabled and therefore are able to participate in an arbitration. The operation of the bus then proceeds again as described above.

As one can see, if all of the devices are enabled and want to take control of the bus, the fair arbitration scheme acts as a pure round robin scheme since the highest priority nodes will be disabled in turn after they control the bus, until each of the nodes has had an opportunity to take control of the bus. The fair arbitration scheme is more efficient, however, since nodes which use the bus more frequently are not forced to wait through time periods reserved for nodes which do not wish to take control of the bus.

What is claimed is:

1. A method for selecting a particular node from a plurality of nodes coupled to a bus, each node having a predetermined priority, to allow said particular node to use the bus, and for enabling the plurality of nodes after each of the nodes has had an opportunity to use the bus to allow a subsequent selection of a particular node, said method comprising the steps of:
   a. enabling for for arbitration each of said nodes having a message to send on the bus; wherein such enabling is performed by each node itself;
   b. monitoring the bus for a bus idle condition;
   c. determining which of said nodes are enabled message nodes,
   d. arbitrating between said enabled message nodes after the bus has been in a bus idle condition for a first period of time, to select the enabled message node having a highest pre-determined priority among said enabled message nodes to use the bus;
   e. disabling said selected enabled message node from arbitration; wherein such disabling is performed by each selected enabled message node itself;
   f. repeating steps b, c, d and e until all said enabled message nodes have been disabled from arbitration; and
   g. thereafter enabling all said nodes for arbitration when the bus has been in a bus idle condition for a second period of time which is longer than the first period of time, while the plurality of nodes and said bus are running and stable.

2. The method of claim 1, further comprising the step of monitoring time elapsed after the bus enters into the bus idle condition.

3. The method of claim 2, wherein step (a) includes the step of setting an internal enable flag in each said node.

4. The method of claim 3, wherein step (e) includes the step of clearing said internal enable flag of said selected enabled message node.

5. The method of claim 4, wherein step (c) includes determining which of said enabled nodes have asserted a busy signal which indicates said enabled node has a message to send.

6. The method of claim 1, wherein step (d) includes comparing a priority asserted by each said enabled message node, and selecting said enabled message node which has asserted a highest priority.

7. The method of claim 1, wherein step (a) includes the step of setting an internal enable flag in each said node.

8. The method of claim 7, wherein step (e) includes the step of clearing said internal enable flag of said selected enabled message node.

9. The method of claim 1, wherein step (c) includes determining which of said enabled nodes have asserted a busy signal which indicates said enabled node has a message to send.

10. The method of claim 1, wherein step (d) includes comparing a priority identification bit asserted by each said enabled message node, and selecting an enabled message node which has asserted a corresponding priority identification bit that has a highest priority among the asserted priority identification bits.

11. The method of claim 1, wherein said first period of time is approximately 800 nsec, and said second period of time is approximately 1600 nsec.

12. In a bus system, having a bus and a plurality of nodes coupled to the bus, each node having a predetermined priority, an apparatus for implementing decentralized arbitration comprising a plurality of arbitration devices, one provided for each node and coupled to the bus, each device comprising:

means for self-enabling the node corresponding to the arbitration device for arbitration;

means for monitoring the bus to detect a bus idle condition and for measuring an amount of time elapsed after the bus enters into the bus idle condition;

means for determining whether the node corresponding to the arbitration device is an enabled message node an enabled message node being an enabled node that has a message to send on the bus;

means for interacting with other arbitration devices when the node corresponding to the arbitration device is an enabled message node to arbitrate and select an enabled message node after the bus is in the bus idle condition for a first period of time, such that the enabled message node having a highest pre-determined priority among the enabled message nodes is selected to use the bus; and means for self-disabling the node corresponding to the arbitration device from arbitration once the node is selected;

said means for enabling responsive to the bus being in an idle condition for a second period of time which is longer than the first period of time to enable the node corresponding to the arbitration device for arbitration, while the plurality of nodes and said bus are running and stable.

13. A node adapted to be coupled no a bus with at least one other node, each node having a pre-determined priority, the node comprising:

means for self-enabling said node for arbitration when said node has a message to send on the bus;

means for monitoring the bus to detect bus idle condition and for measuring an amount of time elapsed after the bus enters into the bus idle condition;

means for interacting with at least one arbitration device when said node is an enabled message node to arbitrate and select between enabled message nodes coupled to the bus after the bus is in the bus idle condition for a first period of time, such that said enabled message node having a highest pre-determined priority among said enabled message nodes is selected to use the bus; and means for disabling said node from arbitration once selected, wherein such disabling is performed by the node itself;

said means for enabling responsive to the bus being in the bus idle condition for a second period of time which is longer than the first period of time to enable said node for arbitration, while the plurality of nodes and said bus are running and stable.

14. A method for arbitrating among a plurality of nodes coupled to a common bus to select one of the plurality of nodes to use the bus for communication, the method comprising the steps of:

(a) assigning a predetermined priority to each node of the plurality of nodes;

(b) operating each node of the plurality of nodes to enable itself for arbitration;

(c) operating each node of the plurality of nodes to monitor the bus for a bus idle condition;

(d) after a bus idle condition has subsisted for a first predetermined period of time, operating each node of the plurality of nodes to assert a signal when the node is enabled and the node has a message to send on the bus, the signal containing an indication of the predetermined priority of the node;

(e) thereafter operating each one of the enabled nodes that has a message to send to compare its predetermined priority with the predetermined priority contained in the signal asserted by each other enabled node that has a message to send to determine if its priority is the highest priority;

(f) thereafter operating an enabled node with the highest priority that has a message to send to take control of the bus for communication and to disable itself from arbitration;

(g) repeating steps (c)–(f) until all enabled nodes that have a message to send have been disabled from arbitration; and (h) operating each one of the disabled nodes to monitor the bus for a bus idle condition and to enable itself when a bus idle condition subsists on the bus for a second predetermined period of time, which second period of time is longer than the first period of time.

15. A method for selecting a particular node from a plurality of nodes coupled to a common bus to allow said particular node to use said bus for communication, said method comprising the steps of:

(a) assigning a predetermined priority to each node of the plurality nodes;

(b) enabling each node of the plurality of nodes that has a message to send on the common bus;

(c) monitoring the bus for a bus idle condition;

(d) arbitrating between the enabled message nodes after the bus is in the bus idle condition for a first period of time, such that an enabled message node having a highest predetermined priority among the enabled message nodes is selected to use the bus;

(e) disabling the selected enabled message node from arbitration;

(f) operating the selected enabled message node to communicate over the bus;

(g) repeating steps c, d, e and f until all the enabled message nodes have been disabled; and (h) enabling the disabled nodes when the bus is in the bus idle condition for a second period of time which is longer than the first period of time.

16. The method of claim 15 wherein steps (b), (c), (e) (f) and (h) are each performed by each respective node individually and wherein step (d) is performed collectively by the nodes.

17. The method of claim 15, wherein step (b) includes the step of setting an internal enable flag in each one of the plurality of nodes that a message to send.

18. The method of claim 17, wherein step (e) includes the step of clearing the internal enable flag of the selected enabled message node.

19. The method of claim 15, wherein step (b) includes determining which of the enabled nodes have asserted a busy signal which indicates the enabled node has a message to send.

20. The method of claim 15, wherein step (d) includes comparing a priority identification bit asserted by each one of the enabled message nodes, and selecting the enabled message node which has asserted a corresponding priority identification bit that is a highest priority among the asserted priority identification bits.

21. The method of claim 15, wherein the first period of time is approximately 800 nsec, and the second period of time is approximately 1600 nsec.

22. A node adapted to be coupled bus with at least one other node, each node having a predetermined priority, the node comprising:
   (a) an enabler to controllably enable and disable the node for arbitration;
   (b) a monitor to monitor the bus for a bus idle condition; and
   (c) an arbitrator, responsive to said monitor indicating a bus idle condition subsisting for a first period of time, to determine if
      i) the node is enabled for arbitration, and
      ii) the node has a highest predetermined priority among all nodes coupled to the bus and seeking to send a message on the bus;
   (d) the arbitration adapted to take control of the bus when the node has the highest predetermined priority, is enabled for arbitration and has a message to send on the bus;
   (e) the enabler operating to disable the node from arbitration in the event that the arbitrator take control of the bus;
   (f) the monitor indicating when a bus idle condition subsists on the bus for a second period of time, the second period of time being longer than the first period of time; and
   (g) the enabler being responsive to an indication of the second period of time to enable the node for arbitration, while the plurality of nodes and said bus are running and stable.

23. A method for communicating among a plurality of nodes coupled to a common bus, the method comprising the steps of:
   (a) determining each node of the plurality of nodes that has a message to send on the bus;
   (b) monitoring the bus for a bus idle condition;
   (c) upon a bus idle condition subsisting on the bus for a first period of time, selecting through arbitration based upon priority one determined node, each node of the plurality of nodes having a predetermined priority;
   (d) disabling from arbitration the node selected in step (c);
   (e) operating the selected node to communicate over the bus;
   (f) repeating steps (a)–(e) until each node of the plurality of nodes that has a message to send on the bus has been disabled from arbitration;
   (g) monitoring the bus for a bus idle-condition that has subsisted on the bus for a second period of time; and
   (h) enabling for arbitration each of the disabled nodes subsequent to the end of the second period of time, the second period of time being longer than the first period of time, while the plurality of nodes and said bus are running and stable.

24. A computer system comprising:
   (a) a bus;
   (b) a plurality of nodes coupled to the bus;
   (c) each one of said plurality of nodes comprising:
      (i) an enabler to controllably enable and disable the node for arbitration; said enabling said node if said node has a message to send on the bus;
      (ii) a monitor to monitor the bus for a bus idle condition; and
      (iii) an arbitrator, responsive to said monitor indicating a bus idle condition subsisting on the bus for a first period of time, to determine if
         1) the node is enabled for arbitration, and
         2) the node has a highest predetermined priority among all enabled nodes coupled to the bus and seeking to send a message on the bus;
      (iv) the arbitrator adapted to take control of the bus when the node has the highest predetermined priority, is enabled for arbitration and has a message to send on the bus;
      (v) the enabler operating to disable the node from arbitration in the event that the node takes control of the bus;
      (vi) the monitor indicating when a bus idle condition has subsisted on the bus for a second period of time, the second period of time being longer than the first period of time; and
      (vii) the enabler being responsive to an indication of the second period of time to enable the node for arbitration.

25. A method of operating a node adapted to be coupled to a bus, at least one other node being coupled to the bus, the method comprising the steps of:
   (a) assigning a priority to the node, the priority being relative to priorities assigned to all other nodes adapted to be coupled to the bus;
   (b) operating the node to monitor a bus idle condition on the bus; and
   (c) operating the node to take control of the bus after a bus idle condition has subsisted on the bus for a first time period when:
      (i) the node has a message to send the node is enabled for arbitration; and
      (ii) the priority of the node is the highest priority among all other nodes that have a message to send;
   (d) repeating steps (b) and (c) until the node takes control of the bus;
   (e) operating the node to be disabled from arbitration in the event that the node takes control of the bus;
   (f) operating the disabled node to monitor the bus for a bus idle condition; and
   (g) enabling the node for arbitration when the disabled node monitors a bus idle condition that has subsisted on the bus for a second period of time, which second period of time is longer than the first period of time.

* * * * *